June 10, 1969     P. L. RUBEN     3,449,040
SYMMETRICAL PROJECTION LENS
Filed Aug. 5, 1964

| F = 110.27 mm. | | | | f/5.6 |
|---|---|---|---|---|
| Lens | N | V | Radii, mm. | Thicknesses, mm. |
| 1 | 1.620 | 60.3 | $R_1 = +27.5$ | $T_1 = 9.0$ |
| | | | $R_2 = +58.25$ | $S_1 = 2.5$ |
| 2 | 1.785 | 26.1 | $R_3 = +22.32$ | $T_2 = 3.0$ |
| | | | $R_4 = +16.58$ | $S_2 = 9.74$ |
| Diaphragm | | | | $S_3 = 9.74$ |
| 3 | 1.785 | 26.1 | $R_5 = -16.58$ | $T_3 = 3.0$ |
| | | | $R_6 = -22.32$ | $S_4 = 2.5$ |
| 4 | 1.620 | 60.3 | $R_7 = -58.25$ | $T_4 = 9.0$ |
| | | | $R_8 = -27.5$ | |

United States Patent Office 3,449,040
Patented June 10, 1969

3,449,040
SYMMETRICAL PROJECTION LENS
Paul L. Ruben, Rochester, N.Y., assignor to Minnesota Mining and Manufacturing Company, St. Paul, Minn., a corporation of Delaware
Filed Aug. 5, 1964, Ser. No. 387,659
Int. Cl. G02b 9/34, 9/36
U.S. Cl. 350—209                                    1 Claim

ABSTRACT OF THE DISCLOSURE

There is disclosed a symmetrical lens especially suitable for projecting an image at full size or a magnification ratio of 1:1, the lens being made up of only four simple meniscus elements arranged symmetrically, the first and last elements being positive meniscus elements, and the second and third elements being negative meniscus elements. The lens is truly symmetrical not only with respect to shape but also with respect to the kind of glass employed.

---

Figures 1, 2:
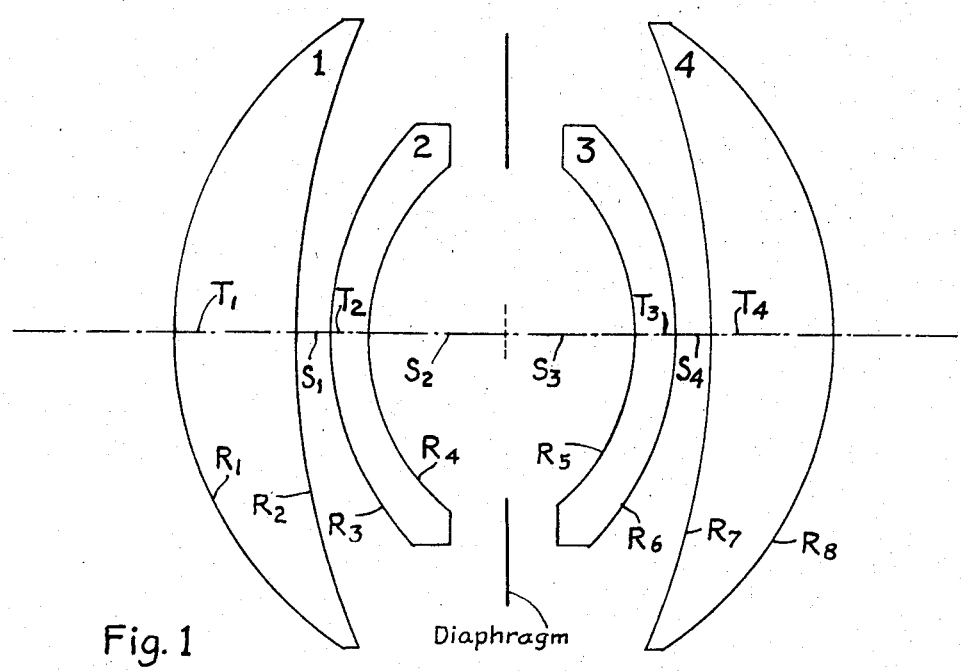

This invention relates to a projection lens, and more particularly to a projection lens of what is often called the symmetrical type, in which the elements in the rear half of the complete lens are duplicates of those in the front half, but reversely oriented in an axial sense.

An object of the invention is the provision of a generally improved and more satisfactory projection lens.

Another object is the provision of a projection lens which is particularly suitable for copying at full size or a magnification ratio of 1:1, although useful also for other purposes.

Still another object is the provision of such a lens which is capable of high quality image formation at a ratio of 1:1, with a relative aperture of at least $f/5.6$ with respect to infinity focus position, and with a comparatively large field of at least 66 degrees total, with no vignetting.

A further object is to provide such a lens which is of simple and low cost construction, considering the superior quality of optical performance which is achieved, the lens being well corrected for chromatic and spherical aberrations, and for astigmatism, and for flatness of field, and one which is completely free from coma and distortion because of its truly symmetrical nature.

A still further object is the provision of such a lens which is so designed and constructed as to transmit radiant energy in the wavelength region from 430 to 550 millimicrons (m$\mu$) with a peak sensitivity at 486 m$\mu$.

These and other desirable objects may be attained in the manner disclosed as an illustrative embodiment of the invention in the following description and in the accompanying drawing forming a part hereof, in which:

FIG. 1 is a diagram of a lens according to a preferred embodiment of the invention; and FIG. 2 is a table of numerical data with respect to the preferred specific embodiment of such a lens.

Symmetrical lenses, broadly, are known in the art, as well as lenses which are often called symmetrical but which are not truly symmetrical because of some slight differences in the lens elements in the rear half of the lens as compared with those in the front half. All of the prior lenses, both those which are truly symmetrical and those which are almost but not quite truly symmetrical, have suffered from one disadvantage or another. The lens of the present invention is an improvement over the prior ones of this general type, eliminating many of the disadvantages of the prior lenses. The present lens comprises four elements, the front and rear elements being a pair of positive meniscus lenses of identical construction but oppositely faced, and the two intermediate elements being a pair of negative meniscus lenses identical with each other and oppositely faced, the diaphragm being located midway between these negative elements. All four are singlet elements, so that a very economical construction is provided. In quantity production, it is necessary to manufacture only two different kinds of lens elements, that is, a supply of the positive meniscus elements and a supply of the negative meniscus elements, and then two of the positive elements and two of the negative elements are assembled in the relative positions above indicated, to make the complete lens, no cementing of any element to another element being required.

In the following disclosure, the individual lens elements are numbered from 1 to 4, consecutively from front to rear, although it will be realized from what has been said above that since the lens is truly symmetrical, it does not matter which is the front and which is the rear. Thus element 1 is identical with element 4, but faced in the opposite direction, and element 2 is identical with element 3, but faced in the opposite direction.

The radii of curvature R of the lens surfaces, the axial thicknesses T of the lens elements, and the axial air spacings S are all expressed in the customary manner, with the usual subscript numerals indicating the particular surface, lens thickness, or air space, numbered in sequence from front to rear. Positive and negative values of R indicate surfaces respectively convex and concave toward the front. It should be pointed out, however, that unlike the numbering of air spaces frequently used elsewhere, $S_2$ does not refer in this instance to the total space between elements 2 and 3 but rather refers to the air space between element 2 and the diaphragm plane (that is, one-half of the total space between elements 2 and 3) and $S_3$ refers to the other half, from the diaphragm plane to element 3. Thus $S_4$ is the axial air space between elements 3 and 4.

The respective refractive indices, expressed with reference to the spectral D line of sodium, are indicated by N, and the dispersive indices or Abbe numbers are indicated by V, with subscripts when necessary to identify the particular lens element. The equivalent focal length of the entire objective or lens assembly, measured in light of wavelength 486 m$\mu$, is indicated by F.

According to the present invention, good results are attained when the variable factors of thickness, spacing radii, refractive indices, and dispersive indices are kept substantially within the ranges or limits indicated by the following notations:

TABLE 1

$0.0733F < T_1 = T_4 < 0.0897F$
$0.0245F < T_2 = T_3 < 0.0299F$
$0.0204F < S_1 = S_4 < 0.0250F$
$0.0794F < S_2 = S_3 < 0.0970F$
$0.224F < R_1 = -R_8 < 0.274F$
$0.475F < R_2 = -R_7 < 0.581F$
$0.182F < R_3 = -R_6 < 0.222F$
$0.135F < R_4 = -R_5 < 0.165F$ $$0.425 < \frac{R_1}{R_2} = \frac{-R_8}{-R_7} < 0.519$$

$$1.21 < \frac{R_3}{R_4} = \frac{-R_6}{-R_5} < 1.48$$

$1.610 < N_1 = N_4 < 1.630$
$1.750 < N_2 = N_3 < 1.790$
$54.0 < V_1 = V_4 < 64.0$
$24.0 < V_2 = V_3 < 30.0$

For best results, all of the variables are preferably kept within the limits above indicated in Table 1, and in addition, the focal length of each element 1 and 4 is substantially $+0.676F$, and the focal length of each element 2 and 3 is substantially $-0.946F$.

However, some of the advantages of the invention are secured when only part of the variables fall substantially within the limits indicated in Table 1, even though others may fall outside those limits. For example, the spacings $S_1$ and $S_4$ are rather critical in the optical correction of zonal astigmatism, and so should be kept within the indicated limits. The spacings $S_2$ and $S_3$ are not critical to establishment of equivalent focal length of the entire system nor to correction of spherical aberration, but are critical in the placement of the astigmatic node and therefore to the determination of the angular field coverage. Hence if one is content with a smaller angular field coverage, $S_2$ and $S_3$ may vary outside of the range indicated in Table 1.

One successful form of the invention has the following values of the variables R, S, and T expressed as a function of the equivalent focal length of the system.

TABLE 2

$R_1 = -R_8 = 0.249F$
$R_2 = -R_7 = 0.528F$
$R_3 = -R_6 = 0.202F$
$R_4 = -R_5 = 0.150F$
$T_1 = T_4 = 0.0815F$
$T_2 = T_3 = 0.0272F$
$S_1 = S_4 = 0.0227F$
$S_2 = S_3 = 0.0882F$

Such a lens, consrtucted according to Table 2, may be used advantageously for copying at a 1:1 ratio (that is, a magnification of 1.0×) and when so used, the front and rear conjugate distances, from the object to element 1 and from element 4 to the image, are each equal to 1.725F.

A specific example of a lens whose variables fall within the limits of Table 1 and also is in accordance with Table 2 and which meets all of the outlined requirements and gives excellent results, may be constructed in accordance with the numerical data in Table 3, the various symbols therein having the same meanings above explained.

TABLE 3

| Lens | N | V | Radii, mm. | Thicknesses, mm. |
|---|---|---|---|---|
| 1 | 1.620 | 60.3 | $R_1 = +27.5$ | $T_1 = 9.0$ |
|  |  |  | $R_2 = +58.25$ | $S_1 = 2.5$ |
| 2 | 1.785 | 26.1 | $R_3 = +22.32$ | $T_2 = 3.0$ |
|  |  |  | $R_4 = +16.58$ | $S_2 = 9.74$ |
| Diaphragm |  |  |  | $S_3 = 9.74$ |
| 3 | 1.785 | 26.1 | $R_5 = -16.58$ | $T_3 = 3.0$ |
|  |  |  | $R_6 = -22.32$ | $S_4 = 2.5$ |
| 4 | 1.620 | 60.3 | $R_7 = -58.25$ | $T_4 = 9.0$ |
|  |  |  | $R_8 = -27.5$ |  |

In the preferred form of the specific lens having the characteristics set forth in Table 3, elements 1 and 4 have a diameter of 46.0 millimeters, and elements 2 and 3 a diameter of 31.0 millimeters. The focal length of element 1 alone, and of element 4 alone, is +74.632 mm., and the focal length of element 2 alone, and element 3 alone, is −104.31 mm. The entire objective or assembly has an equivalent focal length of 110.37 millimeters, and an aperture of $f/5.6$, and covers a total field of 66 degrees. The conjugate focal distances for magnification of 1.0×, from the object to the front face of element 1, and from the rear face of element 4 to the image, are each 190.44 mm. The specific objective fully satisfies the objects of the invention previously listed, and works excellently in the wavelength region from 430 mμ to 550 mμ, with peak sensitivity at 486 mμ.

What is claimed is:

1. A symmetrical projection lens system comprising four air-spaced lens elements, the first and fourth elements, when numbered consecutively from the front, being positive meniscus lenses, the second and third elements being negative meniscus lenses, the below mentioned characteristics of the four elements and their spatial relationship to each other being substantially in the proportions indicated by the data in the following table:

| Lens | N | V | Radii, mm. | Thicknesses, mm. |
|---|---|---|---|---|
| 1 | 1.620 | 60.3 | $R_1 = +27.5$ | $T_1 = 9.0$ |
|  |  |  | $R_2 = +58.25$ | $S_1 = 2.5$ |
| 2 | 1.785 | 26.1 | $R_3 = +22.32$ | $T_2 = 3.0$ |
|  |  |  | $R_4 = +16.58$ | $S_2 = 9.74$ |
| Diaphragm |  |  |  | $S_3 = 9.74$ |
| 3 | 1.785 | 26.1 | $R_5 = -16.58$ | $T_3 = 3.0$ |
|  |  |  | $R_6 = -22.32$ | $S_4 = 2.5$ |
| 4 | 1.620 | 60.3 | $R_7 = -58.25$ | $T_4 = 9.0$ |
|  |  |  | $R_8 = -27.5$ |  | wherein the lens elements are numbered from front to rear in the first column, the corresponding refractive indices N for the sodium D line of the spectrum are given in the second column, the corresponding dispersive indices V are given in the third column, the radii of curvature R of the respective lens surfaces are given in the fourth column, the respective surfaces being numbered from front to rear and being respectively identified by the subscript numeral used with each R, with plus and minus values of R indicating curved surfaces which are respectively convex and concave toward the front of the lens system, the axial thicknesses T of the respective lens elements identified by the subscript numeral used with each T being given in the fifth column, and the axial spacings S between the successive lens elements being also given in the fifth column, $S_1$ being the spacing between elements 1 and 2, $S_2 + S_3$ being the spacing between elements 2 and 3, and $S_4$ being the spacing between elements 3 and 4.

References Cited

UNITED STATES PATENTS 2,031,792  2/1936  Richter _____ 350—221
2,865,252  12/1958  Reiss _____ 350—221

DAVID SCHONBERG, Primary Examiner.

R. J. STERN, Assistant Examiner.

U.S. Cl. X.R.

350—221